June 27, 1961 P. H. DIXON 2,989,996

POWER OPERATED MECHANISM FOR ASSEMBLING THREADED FASTENERS

Filed Jan. 3, 1958 9 Sheets-Sheet 1

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958 9 Sheets-Sheet 2

INVENTOR
Paul H. Dixon
By Carlson, Pitzner, Hubbard & Wolfe
ATTORNEYS

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958

9 Sheets-Sheet 4

INVENTOR
Paul H. Dixon
By Carlson, Pitzner, Hubbard & Wolfe
ATTORNEYS

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958 9 Sheets-Sheet 7

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958 9 Sheets-Sheet 8

INVENTOR
Paul H. Dixon
By Carlson, Pitzner, Hubbard & Wolfe
ATTORNEYS

POWER OPERATED MECHANISM FOR ASSEMBLING THREADED FASTENERS

Filed Jan. 3, 1958 9 Sheets-Sheet 9

INVENTOR
Paul H. Dixon
By Carlson, Pitzner, Hubbard & Wolfe
ATTORNEYS

United States Patent Office 2,989,996

Patented June 27, 1961

2,989,996

POWER OPERATED MECHANISM FOR ASSEMBLING THREADED FASTENERS

Paul H. Dixon, Dixon Automatic Tool, Inc., 2304 23rd Ave., Rockford, Ill.

Filed Jan. 3, 1958, Ser. No. 706,982
4 Claims. (Cl. 144—32)

The present invention relates to a device for assembling workpieces and more particularly to improved means for screwing together workpieces on an automatic production line basis.

Small mechanical devices and subassemblies are most commonly screwed together either by use of fastening screws or by providing threads on the parts. Thus in the manufacture of such mechanical devices, of which clocks and relays may be taken as typical examples, a manual production line is usually required, including a row of operators equipped with power driven but manually manipulated screw drivers and wrenches. Usually the fastening element must be positioned and started with the fingertips making assembly a tedious and expensive procedure.

In an effort to speed up the assembly process, automatic threading devices have been used in which the threaded elements are fed one by one into a working position and there engaged automatically by a threading tool. Such devices have not been completely satisfactory, particularly when it comes to the smallest sizes of screws where the twisting off of the screw head or the damaging of the thread by application of excessive torque is a common complaint. Moreover, such devices have not been able to "start" the thread with a high degree of reliability with the result that the screw or threaded element becomes cocked and therefore jammed, spoiling the workpiece. Speed has been limited.

Accordingly, it is a primary object of the present invention to provide an assembly device for threaded elements which is capable of automatic, unattended operation at high production rates and with a high degree of reliability. It is a related object to produce an assembling device of the above type which is capable of handling extremely small workpieces, for example, as small as 1/16 of an inch, at high speeds up to 4,000 pieces per hour in a single machine.

It is another object of the invention to provide an automatic assembling machine which prevents application of excessive torque to the workpiece and which operates consistently with minimum waste or spoilage of workpieces. More particularly, it is an object of the invention to provide an assembling machine for screw machine parts which not only cuts off the driving force when a precisely predetermined value of torque has been achieved, but which, upon achieving such predetermined torque, immediately retracts the tool from the workpiece, thereby speeding up the operation and minimizing the possibility of damage to the workpiece. It is a more specific object to provide an arrangement of the above type in which the maximum torque applied to the workpiece may be controlled precisely within predetermined limits.

It is a further object of the invention to provide an assembling machine in which an accurate and centered "starting" of the thread is assured. More specifically, it is an object to provide an assembling device in which the workpieces are deposited in position without interference with the tool, with the tool being lowered subsequently into contact with the workpiece. It is still another object related to the foregoing to provide an improved positioning device which not only provides accurate initial starting or positioning of the workpiece relative to the work but also effective opening or diengagement of the work holding jaws once the thread has started.

It is a still further object to provide a novel sequential mechanism in an automatic assembly machine which permits consistent coordination between the tool and work positioning elements and in which the workpiece is positively held against inertial forces.

It is a still further object of the present invention to provide an assembling machine which has a high degree of versatility. Not only is a single machine capable of handling a wide range of sizes, for example, 1/16 to 3 inches, but portions of the same machine may, if desired, be employed for non-rotary assembling operations, for example, assembly with simple press fit.

Other objects and advantages of the present invention will become apparent upon reading the attached detailed description and upon reference to the drawings in which.

Figure 10:
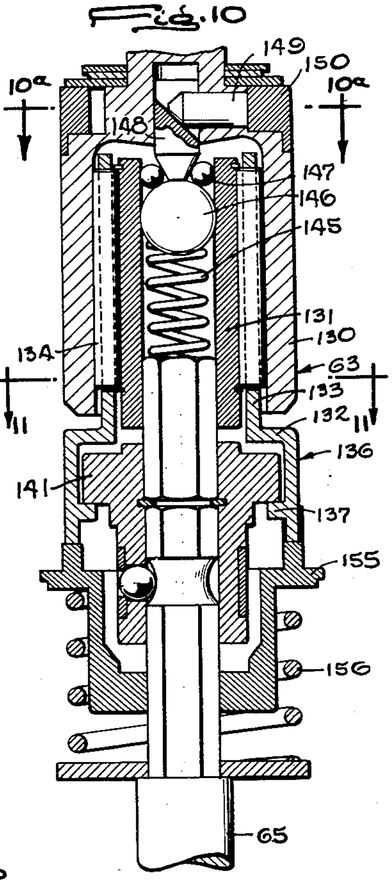
FIG. 10 shows the torque releasing clutch and follow-up member in cross section.
Figure 10A:
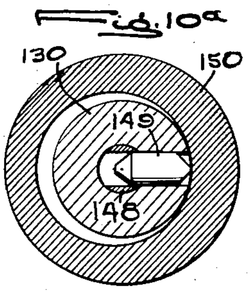

FIG. 10*a* shows a section taken along the line **10*a*—10*a*** in FIG. 10.

Figure 11:
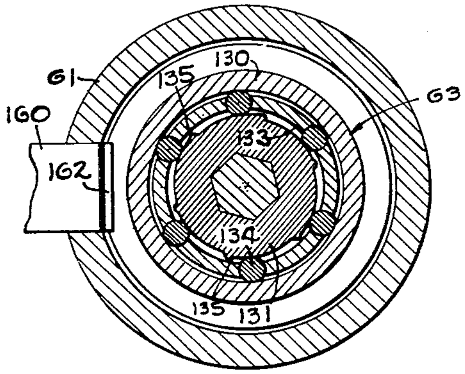

FIG. 11 is a transverse section of the clutch taken along the line 11—11 in FIG. 10 and showing the cam contour, the clutch being in driving condition.

Figure 11A:
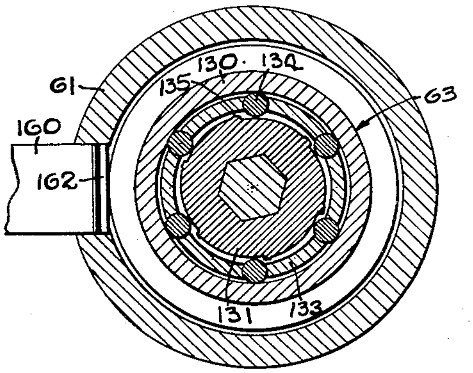

FIG. 11*a* is a transverse section similar to FIG. 11 but showing the clutch elements in released condition.

Figures 12, 13:
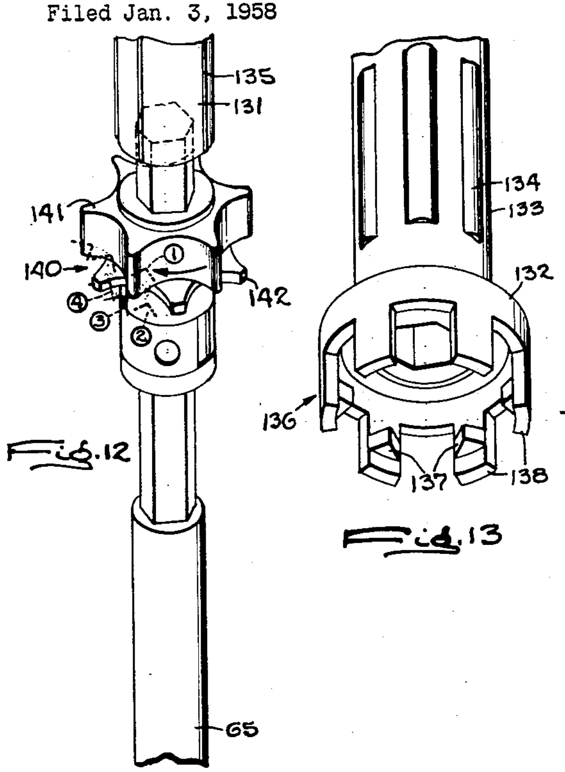

FIG. 12 is a fragmentary view of the clutch output element at the upper end of the tool rod.

FIG. 13 shows the intermediate clutch element having a cage portion and a dog portion.

Figure 14:
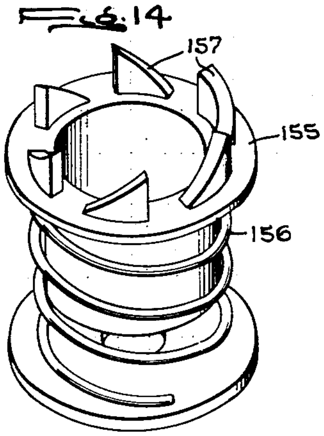

FIG. 14 is a fragmentary perspective of the follow-up member which cooperates with the clutch intermediate member.

Figure 15:
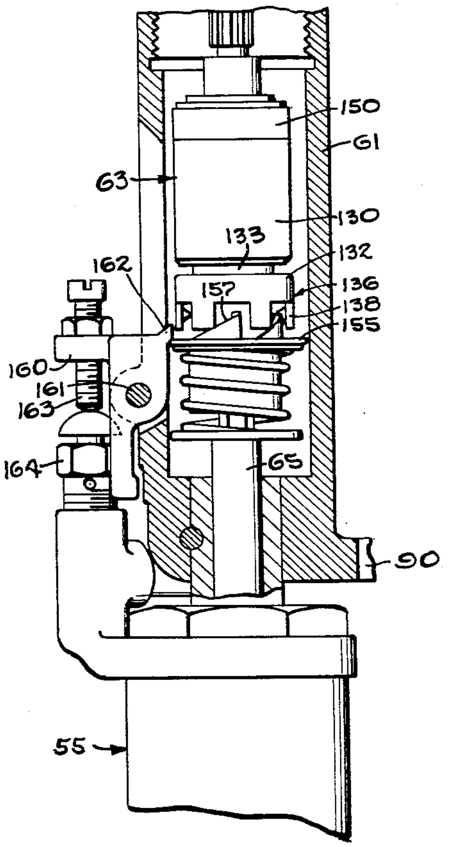

FIG. 15 is a fragmentary view of the clutch showing the connection between the clutch and retract poppet valve under driving conditions, parts being broken away and shown in section.

Figure 15A:
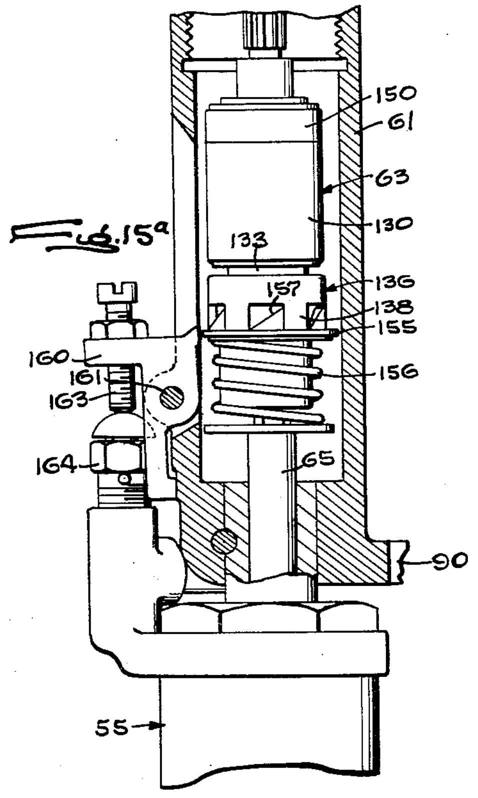

FIG. 15*a* is similar to FIG. 15 but shows the relationship of the parts after "torque out."

Figures 15B, 17, 18, 19:
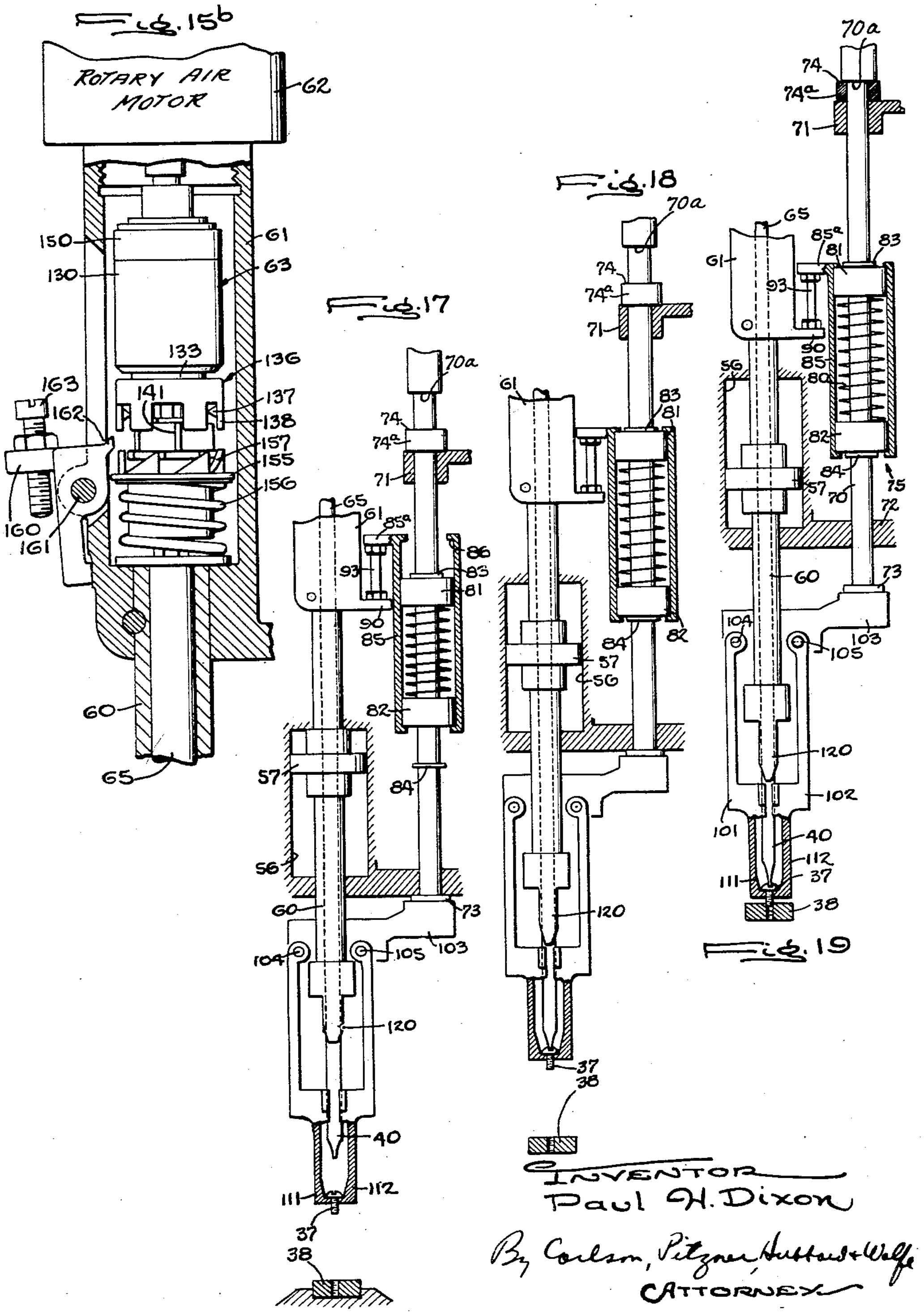

FIG. 15*b* is another view similar to FIG. 15 but shows the "drop out" which occurs when the tool is retracted away from the workpiece following "torque out."

Figure 16:
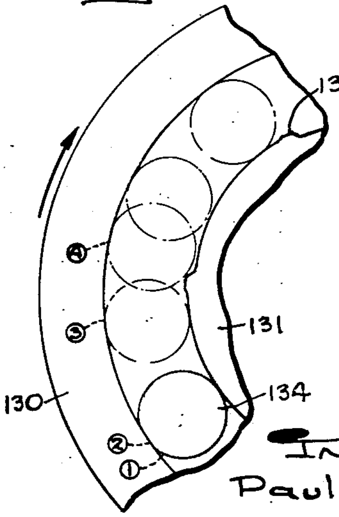

FIG. 16 is a diagram showing the positions, with respect to the cam, occupied by a roller during a typical torque releasing cycle, with the encircled numbers designating positions corresponding to the dog positions in FIG. 12.

FIGS. 17–22 inclusive are a series of diagrams for the purpose of bringing out the sequential operation of the piston rod, tool, and positioner during a typical advancing and retracting cycle.

Figures 4, 23:
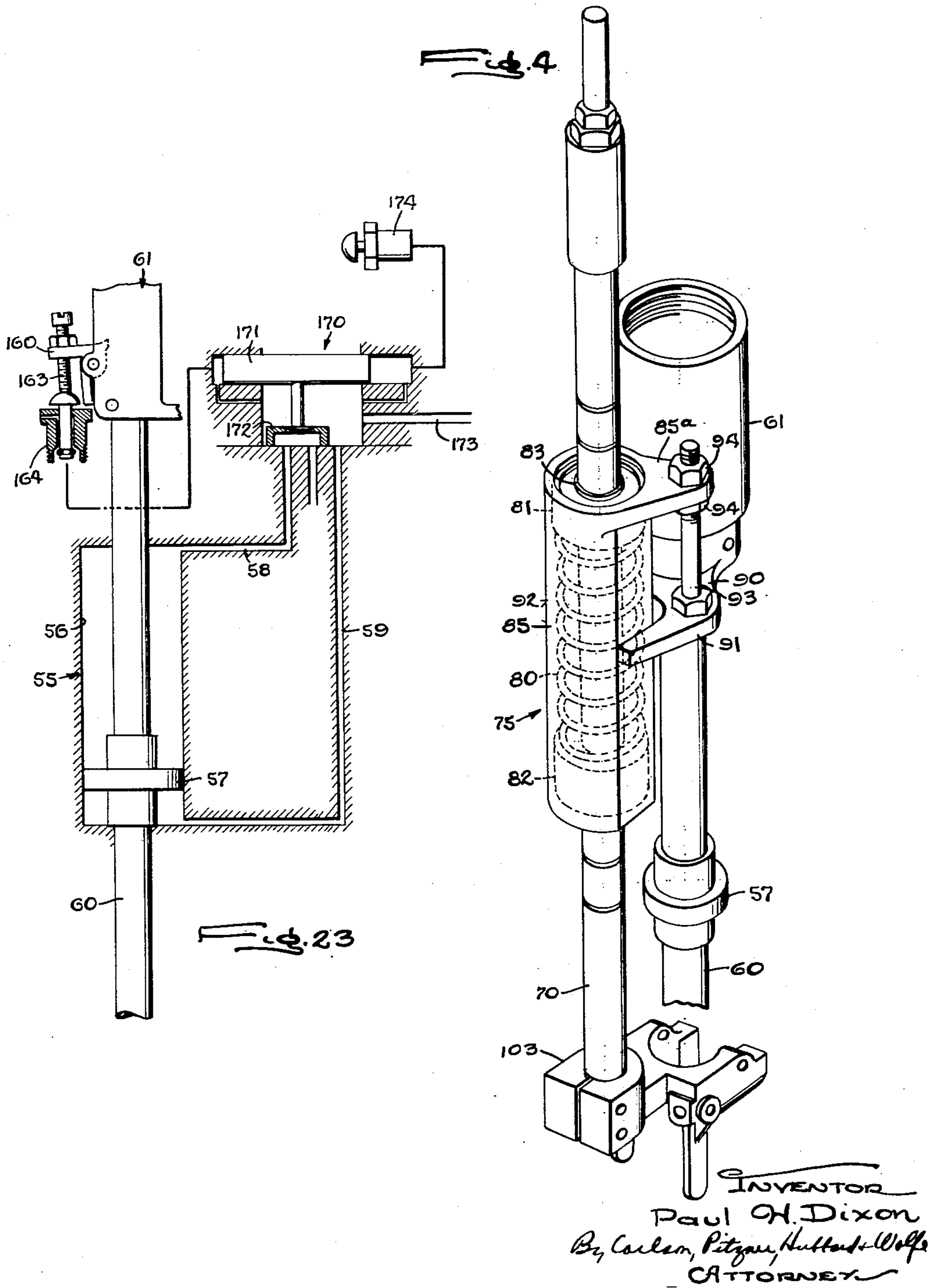
FIG. 4 is a fragmentary perspective showing the coupling between the positioning rod and the piston rod of the actuator.

FIG. 23 shows the pneumatic circuit employed for controlling the operation of the actuator.

While the invention has been disclosed herein in connection with a preferred embodiment, it will be understood that I do not intend to limit the invention to such embodiment but, on the contrary, intend to cover all of the alternative constructions and uses falling within the spirit and scope of the claims which are appended hereto.

Figure 1:
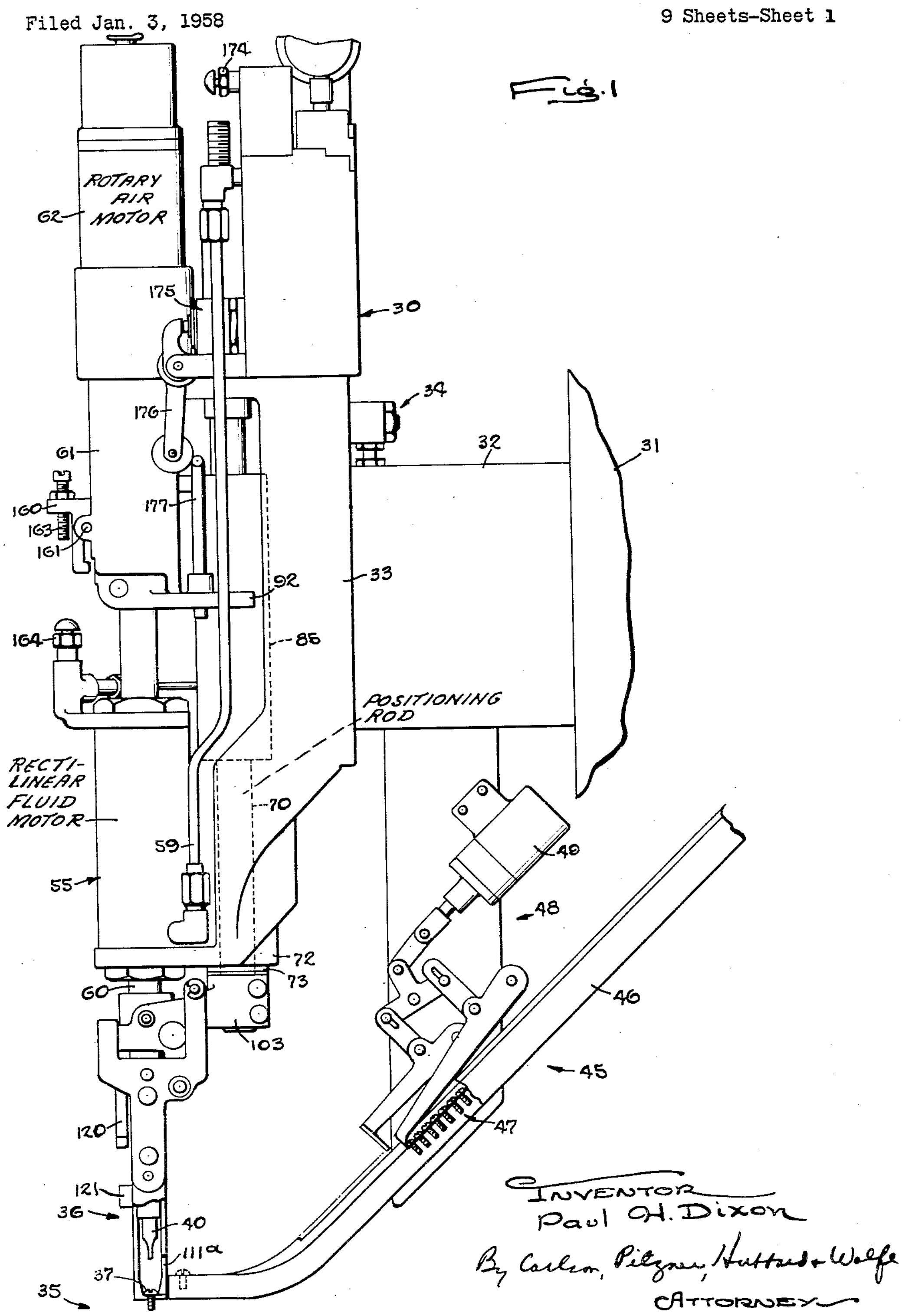
FIGURE 1 is a side elevation of the automatic assembling device with a workpiece in the form of a screw in place and at the beginning of the operating cycle.
Figure 2:
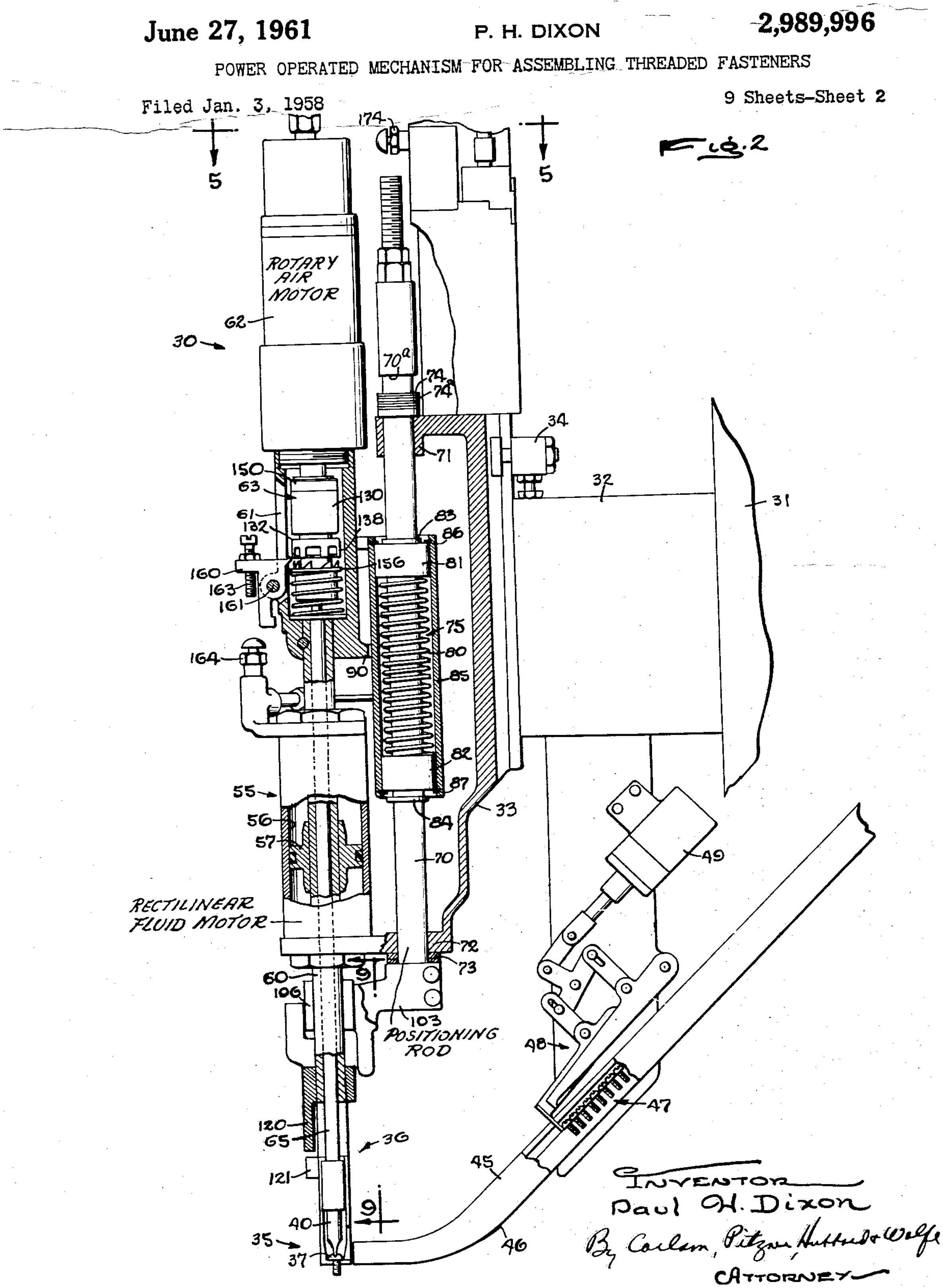
FIG. 2 is a side elevation simliar to FIG. 1 but with certain parts broken away and shown in section to illustrate the internal mechanism, the tool having been advanced into engagement with the workpiece.
Figure 3:
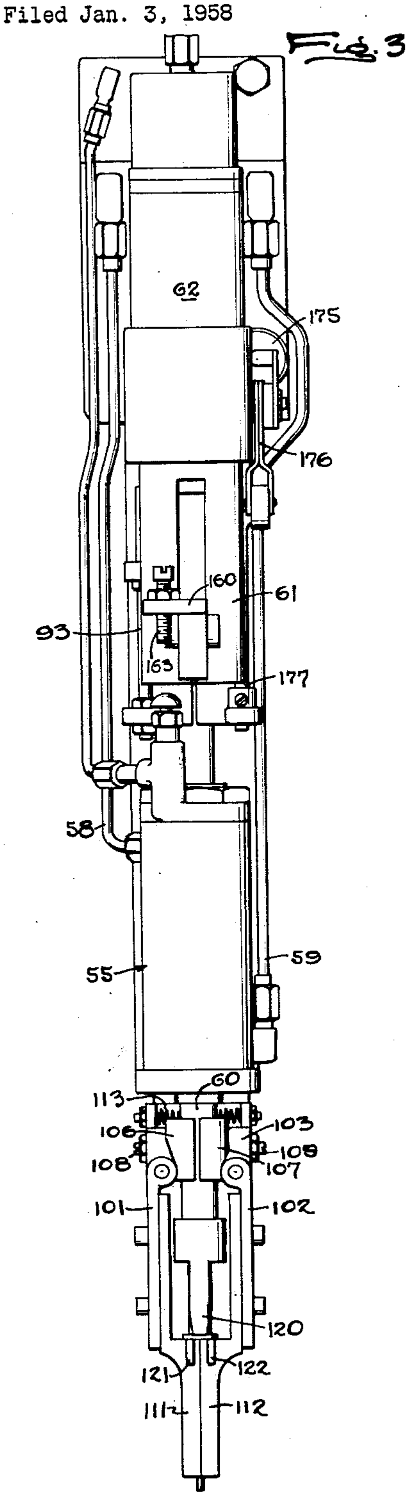
FIG. 3 is a front elevation corresponding to FIG. 2.

Turning now to the drawings, and particularly FIGS. 1–3, a typical assembling device constructed in accordance with the present invention is indicated at 30, being mounted on a support or pedestal 31 by means of a bracket 32 supporting a frame 33. Interposed between the bracket and the frame is an adjusting device 34 which is capable of adjusting the position of the frame 33 longitudinally with respect to the supporting bracket.

At the lower end of the assembling machine is a work station 35 which is occupied by a work positioning device 36 which supports the workpiece 37, here in the form of a machine screw, in a position superposed above the work or second workpiece 38.

With the workpiece 37 in position, the tool 40, in the form of a screwdriver bit, is advanced into engagement with the head of the screw 37. The work positioning device 36 and the tool are then lowered in unison by means to be described for engagement with the work 38 and with the tool appropriately rotating to drive the screw into the work.

In order to feed additional work pieces to the work station and into centered position in the work positioner, a feeding device 45 is employed having a feeder track 46 and a plurality of work pieces 47 which are released by an escapement mechanism 48, one by one, in timed relation to the operating cycle of the assembling machine. The escapement 48 is powered by an actuator 49. Normally the operating cycle may be made repetitive so that the machine may be operated unattended with additional parts 38 being brought into the work station 35 by means of a turntable (not shown) or other transport device, the indexing of which is interlocked with the assembling device shown.

With the purpose of the present device in mind, attention may next be directed to the means for operating the tool 40 and the work positioning device 36.

Rectilinear movement is provided in the present device by means of an actuator 55, the cylinder 56 of which is secured to the frame 33, and having a piston 57 which separates the actuator into upper and lower air chambers fed by air lines 58, 59 respectively. The piston 57 is connected to a piston rod 60. Secured to the upper end of the piston rod 60 for movement with it is a cylindrical subframe 61 mounting a rotary air motor 62 and housing a clutch assembly 63, to which more detailed reference will be made.

In carrying out the present invention, the piston rod 60 is of hollow construction, serving to journal and accommodate a tool rod 65, which interconnects the clutch assembly 63 to the tool 40 previously mentioned. As will later appear, the tool rod has provision for limited movement, for control purposes, with respect to the piston rod 60; however, the tool rod may be considered to move up and down in accordance with the movements of the piston rod. Thus, when the piston rod is upraised, the subframe 61, with its motor and clutch assembly, and the tool rod 65 are all drawn upwardly.

In accordance with the present invention, the work positioning device 36 is also vertically movable with the force required for the movement being derived from movement of the piston rod but with novel means being provided for obtaining sequential relative movement of the work positioning device and the tool 40. To this end, I provide a positioning rod 70 which is arranged parallel to and adjacent the actuator 55, being slidably mounted in slides 71, 72 formed in the frame 33. Relative movement between the piston rod and the positioning rod 70 is obtained by limiting the movement of the positioning rod in an upward direction by a first set of bottoming stops 73 and in the downward direction by a set of bottoming stops 74, with yieldable spring connection 75 being provided between the subframe 61 and the positioning rod 70 to take up the unused motion of the piston rod.

In order to understand the nature of the spring connection, particular reference is made to FIGS. 2 and 4. In accordance with one of the more detailed aspects of the invention, the spring construction is self-centering, that is, in the absence of bottoming at either of the stops 73, 74, the positioning rod 70 will tend to assume a predetermined position with respect to the piston rod 60. This is accomplished in the present instance by providing a coil spring 80 surrounding the shaft and bearing against slidable ferrules 81, 82 which are urged mutually outward against stops 83, 84 formed on the shaft 70. Surrounding the spring and the ferrules is a spring enclosure or shell 85 having internal stops 86, 87 at its ends which are spaced apart an amount equal to the spacing between the stops 83, 84 on the shaft. In order to couple together the shell 85 and the cylindrical subframe 61, the subframe has an integral yoke 90 comprising arms 91, 92 which straddle the shell 85 thereby to prevent relative twisting between the elements. Provision is made for axial adjustment of the "normal" position of the positioning rod 70 with respect to the piston and the subframe in the form of an adjusting stud 93 which is secured to the arm 91 and which is provided at its upper end with adjusting nuts 94 which engage an ear or projection **85*a* formed on the shell 85**.

It will be apparent from what has just been said that upward movement of the piston rod will be accompanied by corresponding upward movement of the positioning rod 70 until such time as bottoming occurs at the stops 73, which will fix the rod 70 in position while the piston rod continues to move upwardly. Conversely, downward movement of the two rods will occur in unison until such time as bottoming takes place at the upper stops 74 that is, when a shoulder **70*a* engages the stops, which prevents further downward movement of the positioning rod while permitting further movement of the piston rod 60. In order to facilitate adjustment of the upper stops, such stops may include a pile of washers 74*a*** of suitable height.

Figures 5, 7, 8, 9:
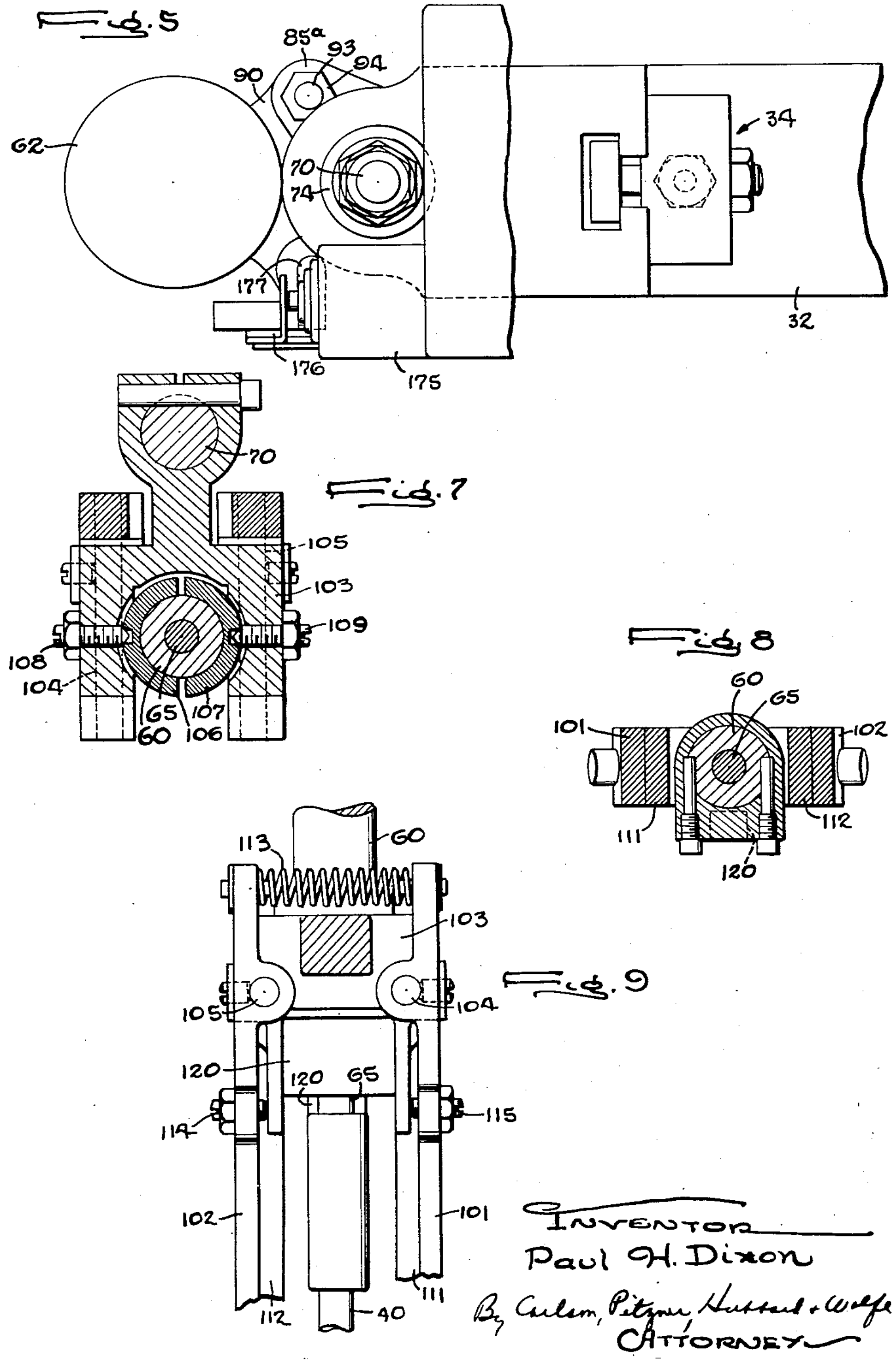
FIG. 5 is a top view of the device looking along the line 5—5 in FIG. 2.
FIGS. 7 and 8 are transverse sections taken along correspondingly numbered lines in FIG. 6.
FIG. 9 is a rear view of the jaw operating mechanism in the form of a fragment taken along the line 9—9 in FIG. 2.

In accordance with the present invention, novel means are provided for disengaging the work positioning device 36, i.e., spreading the jaws thereof out of contact with the workpiece incident to the continued relative movement of the piston rod which occurs following the bottoming of the stops 74. In order to understand how this is brought about, reference is made to the work positioning device shown at 36 in FIG. 6 and in side view in FIG. 2. Here it will be noted that the work positioning device includes a pair of laterally swingable jaws 101, 102 pivoted on a bracket 103 which is secured to the lower end of the work positioning rod 70, the pivots being indicated at 104, 105. In order to insure that an accurate relation is maintained between the work positioning device and the lower end of the piston rod 60, the piston rod is slidably received therein. Referring to the transverse section in FIG. 7, it will be noted that the bracket 103 includes a cylindrical slide comprising opposed halves 106, 107 which are held in position by means of set screws 108, 109. This permits the lateral position of the bracket relative to the rod 60 to be adjusted with a high degree of precision and also enables adjustment of the sliding clearance.

To provide a receptacle for the workpiece, for example the screw shown at 37, the lower ends of the jaws 101, 102 terminate in hollowed out, opposed tips 111, 112. It will be understood that a correctly shaped access opening **111*a* is provided at the region of juncture of the tips 111, 112 (FIG. 6) to allow a workpiece to be discharged between them for the slide 46. The portions 111, 112 comprising the tip of the work positioner are normally kept in engagement with one another by means of a compression spring 113 mounted at the upper end of the jaw members. As shown in the auxiliary view, FIG. 9, stops 114, 115** may be provided to limit the degree of approach of the jaws.

Figure 6:
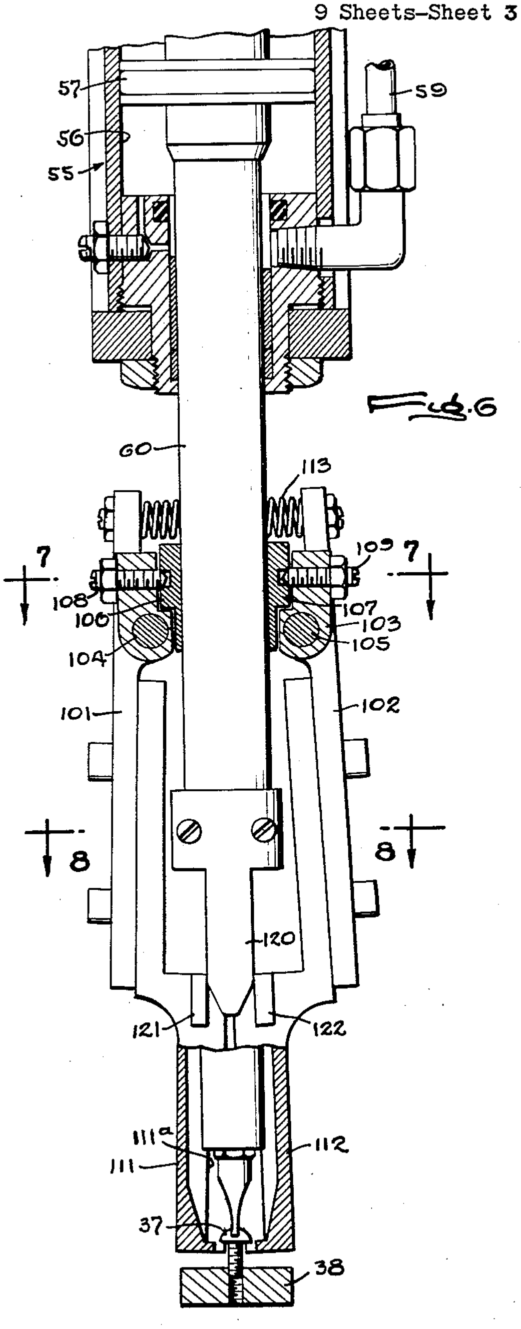
FIG. 6 is an enlarged view of the work positioning jaws and the jaw actuating mechanism, with a portion being broken away and shown in section to reveal the construction.

In accordance with one of the aspects of the present invention, the continued movement of the piston rod 60 after the positioning rod 70 comes to rest, is employed for the camming apart of the jaws which hold the workpiece. As shown in FIG. 6, this is accomplished by a cam 120 which is inserted between cam followers 121, 122 on the jaws 101, 102 respectively. This spreading apart of the jaws, is timed to occur over the terminal portion of the stroke of the piston rod so that the work positioning jaws move outwardly clear of the workpiece only after threading has safely begun, which is the condition shown in FIG. 6. A more comprehensive discussion of the operating sequence involving the jaws will be deferred until the sequential diagram comprising FIGS. 17–22 is discussed.

*Torque control system*

In accordance with one of the aspects of the invention, means are provided for not only disconnecting the tool rod from the motor upon achieving a predetermined torque loading, but also for causing prompt retraction of the tool from the work. More specifically, means are provided in the clutch assembly 63 which move in response to "torque out" which movement is utilized to operate a sensitive poppet for immediate retraction of the piston rod and tool. In order to understand the means provided for carrying out the invention, particular reference is made to FIG. 10 which shows the clutch assembly in transverse section, as well as FIGS. 11 to 14 which illustrate the component parts thereof.

The clutch itself comprises an outer rotating cylinder or shell 130 connected to the motor 62 and forming an input element, an internal cam 131 of generally cylindrical shape which forms the output element, and an intermediate element 132. The upper end of the intermediate member 132 is formed as a cage 133 carrying rollers 134. Under driving conditions, these rollers occupy positions with respect to the cam 131 as shown in FIG. 11, in which the rollers are crowded between the clutch elements 130, 131 adjacent longitudinal ridges 135 which form a part of the cam surface. Considering the member 130 as the driving element and the inner member 131 as the driven element, the two will be positively locked together until such time as the torque between them is sufficient to roll the rollers 134 over the respective ridges 135. When this occurs, the rollers fall into recessed positions as shown in FIG. 11*a* in which they are ineffective to transmit torque between the input and output elements.

It will be apparent that for the released condition shown in FIG. 11*a* to persist, means must be provided for preventing the rollers from again moving into a crowding position to establish a re-connection of the drive. Thus, to insure that the rollers occupy a predetermined position or phase with respect to the cam, the intermediate member 132 includes what may be termed a "dog" portion 136 divided into segments 138 and having dogs 137, the latter forming a part of an escapement 140. In the present instance, the escapement provides a first star wheel 141 and a second star wheel 142. These star wheels are offset from one another as shown, and are bodily movable with the tool shaft 65 so that either of the two star wheels may be brought into the path of movement of the dogs 137 to establish two conditions of operation, "released" and "driving." In the released condition, the star wheel 141 is in the path of movement of the dogs 137, thereby locking the intermediate member 132 in a position where the rollers 134 are disengaged. Shifting movement between the two conditions is brought about by providing a spring 145 (FIG. 10) which presses downwardly upon the upper hexagonal end of the tool shaft, thereby urging the shaft downwardly and actuating wheel 141 when the tool is upraised. However, when the tool is brought into contact with a workpiece and pressed against such workpiece, the reaction is sufficient to move the tool rod 65 upwardly against the force of compression of the spring, thus moving the star wheel 141 out of engagement and the star wheel 142 into engagement. Since the dogs are then no longer blocked in the "released" position, relative movement of the intermediate member 132 may occur, such movement being facilitated by helical cams to be described, thereby moving the rollers 134 into the crowded position illustrated in FIG. 11. This causes clutching with rotation of the tool rod.

In understanding the operation of the clutch as thus far described, it will be helpful to refer to the numbered dog positions shown in FIG. 12 and the correspondingly numbered roller positions shown in FIG. 16. It will be understood that the dogs and rollers all act in unison; however, to simplify matters only one of the dogs 137 and one of the rollers 134 have been selected as representative. As a starting condition, it will be assumed that the tool has been withdrawn from the work following a normal "torque out." Under such conditions the tool shaft 65 will be in the lowered position with the rollers locked out by reason of engagement of the dog indicated at position 1 against one of the teeth of the star wheel 141. When the tool is advanced into contact with the work, the force of reaction causes the tool rod to move up against the force of the spring 145 thereby moving the first star wheel 141 to an out-of-the-way position and moving the second star wheel 142 into the plane of the dog. At this point, the dog is free to rotate through a small angle, i.e., from position 2 to position 3. This moves the roller into a crowding position and clutching occurs. Upon exceeding a predetermined torque, the roller is forced over the adjacent ridge on the cam with the result that the dog on the intermediate member 132 rotates an additional amount, namely, from position 3 to position 4. In position 4 the roller (FIG. 16) is free and the clutch is disengaged. Subsequent retraction of the tool from the workpiece enables the tool rod 65 to again move downwardly under the urging of the spring 145 which brings the star wheel 141 again into the path of movement of the dog 137. It will be apparent from FIGS. 12 and 16 that the final condition corresponds exactly to that in which the cycle started, except that one escapement tooth has been lost.

In order to adjust the amount of torque at which "torque out" will occur, means are provided increasing or decreasing the clearance between the two input and output members. This is accomplished by machining the members 130, 131 so that the space between them is conically tapered and by providing means for adjusting their endwise positions relative to one another. This change in endwise position is brought about by camming the cam member 131 downwardly with respect to the sleeve 130. To serve as an abutment for the cam member 131, a ball 146 is forcibly pressed into the upper end thereof. Surrounding the ball 146 are a plurality of smaller balls 147 which are engaged by the conical tip of an adjusting member 148. For camming the member 148 inwardly, a tapered thrust member 149 is used, the position of the latter being controlled by an eccentric adjusting ring 150 (FIG. 10*a*). It will be apparent that since the rollers 134 are restrained against endwise movement by the cage 133, their position remains constant, hence moving the cam endwise in one direction (depending upon the direction of taper) results in an increased effective clearance for the rollers 134 so that they will be relatively free to roll over the ridges provided on the cam, thereby to produce a low torque setting. Conversely, a high torque setting may be achieved by moving the cam in the opposite direction, thereby decreasing the roller clearance and requiring considerable force to be applied before the device will "torque out."

In accordance with one of the aspects of the invention, novel means are provided for converting the relative rotation of the intermediate member 132 with respect to the cam 131 which occurs incident to "torque out" into axial movement which may be sensed in spite of clutch rotation for triggering retracting movement of the actuator 55. To accomplish this, a disc-shaped follow-up member 155 (FIGS. 14 and 15) is provided which is spring pressed in the direction of the lower end of the intermediate member 132 by means of a spring 156 and which has helical cam surfaces 157 provided on its upper surface. As shown in the drawings, the latter helical surfaces engage the segmented ends 138 formed on the member 132.

The manner in which the axial movement of the follow-up member 155 is utilized in producing retraction is shown in FIGS. 15, 15*a* and 15*b*. Here it will be noted that a bell crank lever 160 is provided, pivoted at 161, and having a laterally extending ear 162 which extends into the path of axial movement of the member 155. Mounted on the outwardly extending arm of the bell crank lever 160 is a set screw 163 which bears against the actuator on a poppet valve 164. Gravity acts to maintain the bell crank lever biased in a counterclockwise direction.

Under normal driving conditions, the entire clutch assembly including the member 155 rotates. However, such member is maintained in the phase position shown in FIG. 15 by the fact that the intermediate member 132 is locked in its running phase position with respect to the cam 131, and hence with respect to the tool shaft 65.

When "torque out" occurs, the phase position of the intermediate member with respect to the tool shaft changes, the resulting rotation of the segments 138 permitting the helical surfaces 157 to advance upwardly. This is accompanied by upward movement of the follow-up member 155 which, in its path of movement, engages the ear 162 formed on the bell crank 160. This causes the bell crank to be rotated in a counterclockwise direction, depressing the poppet valve 164. The latter causes the lower chamber of the actuator to be pressurized thereby causing immediate upward movement of the piston rod, tool shaft and tool.

The pneumatic system employed for retracting the drive assembly upwardly when "torque out" occurs is shown in FIG. 23. Here it will be noted that the poppet valve 164 is connected to a pneumatic control valve 170 having a plunger 171 and a slide 172 which is capable of feeding air alternatively to the conduits 58, 59 of the actuator. The control valve 170 is shown in the condition in which it exists immediately following a "torque out" and after the poppet valve 164 has been actuated. Actuation of the poppet valve serves to vent the left hand chamber of the control valve 170 so that the plunger 171 is moved to its left hand position. This moves the slide 172 to the left so that there is a free and unobstructed path from the supply line 173 through the conduit 59 to the lower chamber of the actuator 55 which will propel the piston 57 upwardly without delay.

Where it is desired to provide manual control in the opposite direction, a poppet 174 may be used connected to the right hand chamber of the valve 170.

In the course of restoring the piston and drive assembly to the upper or retracted position, a limit switch 175 (FIG. 1) is actuated by means of a rocker arm 176 engaging a post 177 which is mounted on a yoke arm 92 of the cylindrical subframe 61. Closure of this switch may be used in any suitable manner well known in the art to initiate indexing of the work table.

*Résumé of operation*

While the operation will be apparent to one skilled in the art from the foregoing description, nevertheless it will be helpful to refer to the diagrams, FIGS. 17–22, which set forth a typical stroke cycle. At the outset, it will be assumed that the piston rod is in its uppermost position which is the position shown in FIGURE 1. Under such conditions, bottoming of the stops 73 associated with the positioning rod 70 has occurred so that the spring 80 is compressed as shown. Since the piston rod is retracted with respect to the positioning rod, it will be apparent that the cam 120 is well clear of the cam followers 121, 122 on the work positioning jaws. Hence the latter will be in a closed position as shown. Under such conditions, the escapement mechanism 48 is actuated by the actuator 49 to deposit a screw in the receptacle between the jaws. Downward movement of the piston may then be initiated either manually or by automatic means, the result of this being shown in FIG. 18. Here it will be noted that during the first portion of the downward movement, the spring 80 surrounding the rod 70 has been allowed to expand to its neutral position. Thus, downward movement of the piston rod and the cam 120 carried at its lower end has been effected without any corresponding downward movement of the positioning rod 70. During this portion of the cycle, the screwdriver bit, moving downwardly with the piston rod, lightly engages the slot in the screw. Upon continued downward movement of the piston rod, which is the condition shown in FIG. 19, the tool rod brings the tool more forcibly against the workpiece and the reaction pressure, pushing inwardly on the tool rod, causes the star wheel 141 (FIG. 12) to move out of the way of the dogs 137. Free of obstruction, the intermediate member 132 of the clutch is free to rotate (under the urging of the helical cam surfaces 157) thereby engaging the clutch and starting rotation of the tool rod 65. Simultaneously with such rotation, the work positioner 36 and the tool bit are lowered in step with one another so that the screw begins to screw into the work just as shown in FIG. 19.

It is to be noted that the tool and positioner are lowered simultaneously with the screw captive between them. This insures against the screw's being displaced by inertial forces, keeping in mind that the downward movement of the positioner 36 may exceed the acceleration of gravity.

Figure 21:
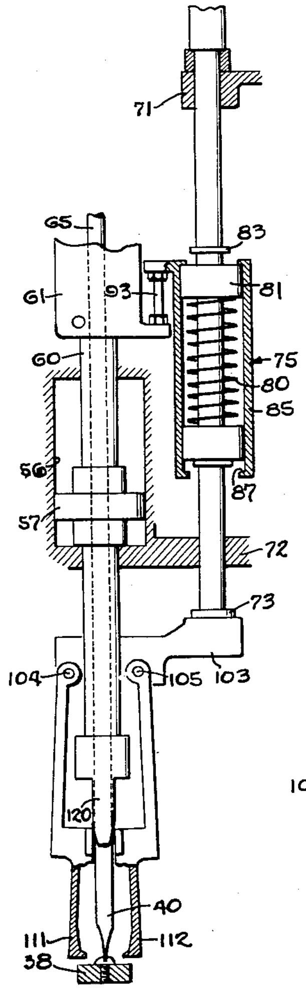
Figure 22:
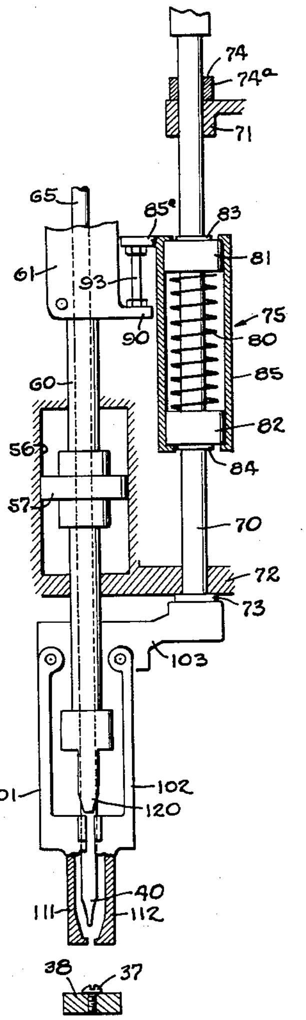
Figure 20:
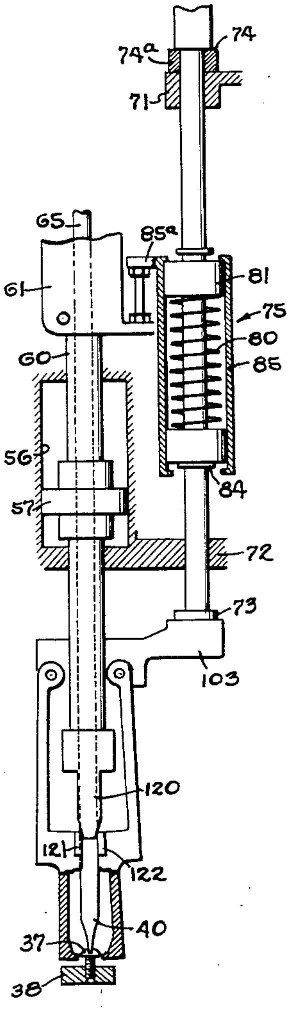

Upon progressive lowering of the piston rod, the stops 74 associated with the work positioning rod 70 engage, thereby cutting off any further lowering movement of the work positioner 36. However, the piston rod continues to lower until the cam 120 at the lower end thereof wedges between the cam followers 121, 122 on the positioner jaws thereby causing the jaws to spread apart as shown in FIG. 20. The tool follows the screw down until the piston in the actuator is practically bottomed as shown in FIG. 21. When bottoming occurs, this is immediately reflected by an increase in torque up to the value for which the clutch has been set so that the clutch "torques out" accompanied by rotation of the intermediate member 132. This not only cuts off the torque supplied to the tool shaft 65, but also produces upward movement of the follower member or disc 155 which rocks the bell crank 160 thereby venting the poppet 164 and pressurizing the lower end of the actuator 55 to produce prompt retraction of the tool, and also the work positioner, from the work. This retraction, which occurs between the conditions shown in FIGS. 21 and 22, really consists of two separate movements. In the first, the spring 80, which has been compressed, is permitted to expand to its neutral condition. This retracts the spreading cam 120, thereby closing the jaws of the work positioner 36. Upon subsequent movement of the piston upwardly, the positioning rod 70 is bodily carried with it, thereby raising the work positioner 36 to the upraised position shown in FIG. 22. Motion following the position shown in FIG. 22 produces retraction of the piston rod and tool back to the position illustrated in FIG. 17 at the beginning of the series, thereby completing a cycle of movement.

It will be apparent from the above description that I have produced a device which meets all of the requirements of a rapid and efficient automatic assembling device for threaded fasteners. While the description of a typical cycle has, for convenience, broken such cycle down into individual components of movement, it will be apparent to one skilled in the art that all of the movement represented by FIGS. 17–22 occurs smoothly and continuously at a repetition rate which is so fast that the eye has difficulty in following it. It has been found that the arrangement described above is eminently suited to the handling of extremely small screws and other threaded components of a size which cannot be handled by conventional automatic devices. Experience has shown that the arrangement substantially eliminates spoilage of workpieces caused by improper positioning and excessive torque. Since the sequence of operations is controlled by mechanical means, it is not possible for the device to get "out of time"; consequently, there is no necessity for making repeated sensitive adjustments. Once the device has been put into operation, it can be expected to perform for long periods of time unattended and without care or attention.

I claim as my invention:

1. In a machine for automatically driving a screw into a workpiece while the latter is held in a predetermined position, the combination of, a support mounted for movement toward and away from the held workpiece including a holder for receiving and temporarily supporting successive screws to be driven, a rotary tool mounted on said support for movement relative thereto to engage a screw held in said holder, a coupling on said support for turning said tool having interengageable toothed parts normally disposed in axial alinement during the transmission of driven torque to said tool and shiftable axially relative to each other when said torque exceeds a predetermined value, a power actuator for advancing the support and said tool toward and away from the work, and means responsive to relative axial shifting of said coupling parts following said torque increase to control said actuator and initiate retraction of said support and tool away from the workpiece.

2. In a machine for connecting a workpiece to an article, the combination of a base, a tool support adapted to carry a tool and mounted on said base to move forward and back along a predetermined path, a power actuator connected to said tool support and operable to move the same along said path, a work support for releasably carrying a workpiece in engagement with said tool and mounted on said base to move along a second and parallel path, releasing means operable when actuated to release the workpiece from said work support, a yieldable connection coupling said work support to said tool support for bodily movement with the latter but operable to yield and permit relative movement between the two supports, an abutment disposed in said second path to engage and stop said work support whereby said tool support moves relative to said work support, means responsive to relative movement between said supports and operable to actuate said releasing means, and a device responsive to movement of said tool support and sensing completion of the assembly of the workpiece, said power actuator being activated by said device to retract said tool support.

3. In a machine for threading a workpiece into an article, the combination of, a base, a member mounted on said base for movement forward and back along a predetermined path, tool support adapted to carry a tool and journaled on said member to turn relative thereto, a lost motion connection coupling said member and said support to permit the member to move relative to the support and subsequently to cause the support to move bodily forward with the member, a reversible power actuator connected to said member and operable to move the member along said path, a motor having a rotated part, a clutch having elements connected respectively to said part and said support and operable when engaged to rotate the support, said clutch being engaged in response to relative movement between said member and said support and including means responsive to the torque applied to the tool support and operable when the torque exceeds a predetermined value to disengage the clutch, a control device operable when activated to reverse said actuator and cause retraction of said member and said support, and means responsive to disengagement of said clutch and operable to activate said control device.

4. In a machine for threading a workpiece into an article, the combination of, a base, a member mounted on said base for movement forward and back along a predetermined path, a tool support adapted to carry a tool and journaled on said member to turn relative to the member and to move bodily therewith along said path, a reversible power actuator connected to said member and operable to move said member and said support along said path, a motor having a rotated part, a clutch having elements connected respectively to said part and said support and operable when engaged to rotate the support, said clutch including means responsive to the torque applied to said tool support and operable when the torque exceeds a predetermined value to disengage the clutch, a control device operable when activated to reverse said actuator and cause retraction of said member and said support, and means responsive to disengagement of said clutch and operable to activate said control device.

References Cited in the file of this patent

UNITED STATES PATENTS

| | | |
|---|---|---|
| 2,292,146 | Meunier | Aug. 4, 1942 |
| 2,314,760 | Blair | Mar. 23, 1943 |
| 2,484,364 | Whitledge | Oct. 11, 1949 |
| 2,570,164 | Shaff | Oct. 2, 1951 |
| 2,605,792 | Havener | Aug. 5, 1952 |
| 2,621,767 | McDevitt | Dec. 16, 1952 |
| 2,646,091 | Austin | July 21, 1953 |
| 2,664,121 | Travis | Dec. 29, 1953 |
| 2,689,589 | Allen et al. | Sept. 21, 1954 |
| 2,696,855 | Seegers | Dec. 14, 1954 |
| 2,743,636 | Shaff | May 1, 1956 |
| 2,771,804 | Better et al. | Nov. 27, 1956 |
| 2,775,326 | Better et al. | Dec. 25, 1956 |
| 2,820,494 | Haberstump | Jan. 21, 1958 |
| 2,835,365 | Rice et al. | May 20, 1958 |
| 2,857,997 | Graybill | Oct. 28, 1958 |
| 2,886,075 | Skoog | May 12, 1959 |